United States Patent [19]

Green

[11] Patent Number: 4,568,593
[45] Date of Patent: Feb. 4, 1986

[54] COMPOSITE CORRUGATED PANEL WITH TRANSVERSE FIBERS

[75] Inventor: Andrew Green, Fort Worth, Tex.

[73] Assignee: Composite Technology, Inc., Ft. Worth, Tex.

[21] Appl. No.: 677,832

[22] Filed: Dec. 3, 1984

Related U.S. Application Data

[63] Continuation-in-part of Ser. No. 494,955, May 16, 1983, Pat. No. 4,504,343.

[51] Int. Cl.$^4$ .......................... B32B 1/00; B32B 17/00
[52] U.S. Cl. .................................... 428/110; 428/114; 428/182; 428/184
[58] Field of Search ............... 428/107, 105, 109, 110, 428/114, 113, 182, 179, 184, 186; 156/276

[56] References Cited

U.S. PATENT DOCUMENTS 4,329,194  5/1982  Green et al. ................... 156/245
4,460,633  7/1984  Kobayashi et al. ............. 428/110

OTHER PUBLICATIONS

Ackley et al., Composite Material-Structural Molding Cpd; 34th Annual Technical Conference, 1979, Reenforced Plastics/Composites Institute, The Society of the Plastics Industry, Inc., Sec. 21-D pp. 1-6.

Primary Examiner—Michael Ball
Attorney, Agent, or Firm—James E. Bradley

[57] ABSTRACT

A corrugated composite panel has improved strength and load carrying abilities. Two layers of transverse unidirectional filaments sandwich a layer of unidirectional filaments which are parallel with the corrugations. The layers are impregnated with resin. Also, one or more layers of chopped randomly oriented filaments are included.

15 Claims, 7 Drawing Figures

COMPOSITE CORRUGATED PANEL WITH TRANSVERSE FIBERS

CROSS-REFERENCE TO RELATED APPLICATION

This is a continuation-in-part of application Ser. No. 494,955, filed May 16, 1983 now U.S. Pat. No. 4,504,343.

BACKGROUND OF THE INVENTION

The present invention relates to composite members, and in particular to corrugated fiberglass panels having improved strength and stiffness.

Fiberglass panels are commonly constructed by using short chopped, randomly oriented fiberglass fibers or filaments and a resin. The fibers consist of chopped strands less than about 2 inches in length which are randomly arranged in the panel. The panel is molded into the shape of a corrugated member in a continuous process. Normally, the total weight of the filaments in such a panel is about 12–30 percent of the total weight of the panel. Such fiberglass designs are not intended to bear heavy loads since the transfer of loads through the chopped strands in the panel is haphazzard.

Another fiberglass construction technique uses a layer of continuous longitudinal unidirectional filaments and a layer of woven fiberglass filaments, known as woven roving, to lend strength to the article. See, for example, U.S. Pat. No. 4,029,172. This method produces stronger than conventional fiberglass panels but has some disadvantages.

SUMMARY OF THE INVENTION

In this invention, in one embodiment a primary backing web which is preferably a veil material is drawn toward a primary bath of resin. A first transverse layer of unidirectional filaments is laid down on the primary web backing as the web is drawn toward the bath. A web of longitudinal unidirectional filaments in drawn through the bath of resin simultaneously with the first transverse layer and primary backing web to impregnate the filaments with resin. A second transverse layer of unidirectional filaments is then laid down on top of the longitudinal unidirectional filaments. Preferably, a secondary web of veil material is then drawn through a secondary bath of resin simultaneously with the second transverse fibrous layer, longitudinal unidirectional filaments, first transverse layer and first web of veil material to form a composite web. The composite web is then shaped and cured in an oven.

The longitudinal unidirectional filaments are preferably continuous glass fibers which run the length of the member being constructed. The transverse layers preferably contain a plurality of unidirectional fiberglass filaments arranged substantially perpendicular to the longitudinal axis of the longitudinal fiberglass filaments.

The apparatus of the invention used to construct the members includes a pair of primary rotatable rollers adapted for receiving a primary web of veil material and a means for laying down a first transverse unidirectional layer onto the primary web of veil material as the veil material is drawn toward the primary rollers. Means are provided for supplying a web of longitudinal filaments to the primary rollers simultaneously with the first transverse layer and primary web of veil material. A resin applicator applies resin to the longitudinal filaments, first transverse layer and primary web of veil material as the unidirectional filaments, first transverse layer and primary web of veil material exit the primary rollers. Means are provided for laying down a second transverse unidirectional layer onto the longitudinal filaments. A pair of secondary rotatable rollers receive the longitudinal filaments, first transverse layer and primary web of veil. A second resin applicator applies resin to the second transverse layer, longitudinal filaments, first transverse layer and primary web of veil as these materials enter the secondary rollers. The members thus formed are received in an oven where they are cured and shaped to produce the finished members.

The means for laying down the transverse layers can be rapier weaving devices adapted to apply filaments oriented substantially perpendicular to the longitudinal axis of the unidirectional fiberglass filaments.

Each of the finished composite members produced by the method and apparatus of the invention has a center ply of unidirectional longitudinal filaments made up of continuous fibers running the length of the member. Upper and lower transverse unidirectional layers surround the center ply of unidirectional longitudinal filaments. The transverse layers are comprised of filaments oriented perpendicular to the unidirectional longitudinal filaments. The center ply and upper and lower transverse layers are impregnated with resin to form the composite member. The upper and lower transverse layers which run perpendicular to and encapsulate the longitudinal unidirectional fibers hold the shape of the corrugation while the longitudinal fibers are stressed, thereby increasing the strength and stiffness of the corrugation.

In a second embodiment, at least one layer of chopped fiber is applied to the web. The chopped fiber reduces residual stress in the panel. Preferably one layer of chopped fiber is located on each side of the longitudinal layer.

Additional objects, features and advantages will be apparent in the written description which follows.

DETAILED DESCRIPTION OF THE INVENTION

Figure 1:
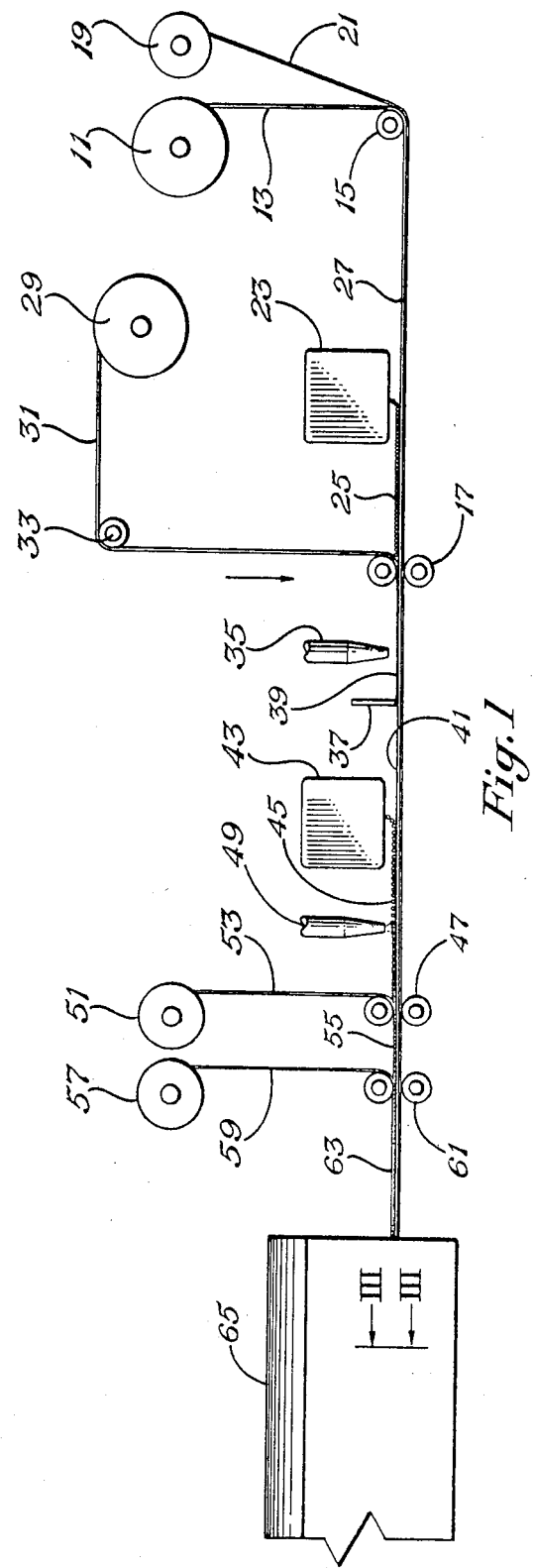
FIG. 1 is a schematic illustrating a method and apparatus used in forming composite members in accordance with this invention.

Referring to FIG. 1, the apparatus for forming composite members of the invention is shown and includes a supply roll 11 for supplying a primary backing web of veil material. The veil material is known to those skilled in the art and is preferably a polyester felt. Veil is a thin, porous material which is usually an organic material but can be made from various synthetic polymers, glass fiber veil or even natural fibers. The veil web 13 passes around a roller 15 and is drawn toward a pair of primary rotatable rollers 17.

A supply roll 19 can also be provided for supplying a web of impermeable thermoplastic film which passes around roller 15 and serves as a backing for the veil web 13 as the webs are drawn toward the primary roller 17. The roll 19 is preferably Mylar, a trademark for a thermoplastic polyester film that is the reaction product of terephthalic acid and ethylene glycol. Other suitable films include synthetic polymers such as polyvinylidene chloride film, polyethylene film, cellulose acetate film, and regenerated cellulose (cellophane). The thermoplastic film 21 forms a base for receiving the fiberglass resins, as will be explained, and can be peeled away from the finished product.

The equipment for forming the composite member of the invention also includes a first means 23 for laying down a first transverse layer 25 of unidirectional filaments onto the primary web 27 of veil material as the veil material 27 is drawn toward the primary roller 17. The first means 23 indicates schematically a rapier weaving device of the type used in the textile industry for weaving. The filaments of layer 25 are pulled off in bundles or rovings by the first means 23 and laid flat. The filaments of layer 25 extend the full width of the web, are closely spaced and substantially in a single plane. They are not woven with filaments running in other directions as in a woven roving.

Although the first transverse layer 25 is shown supplied by the first rapier weaver 23 as a plurality of cut filaments, layer 25 could be comprised of a knitted material. This material has a plurality of cut transverse filaments extending the width of the web and loosely joined together by thin threads to maintain a flat web with a plurality of unidirectional parallel filaments.

A spool 29 is provided for supplying a web of unidirectional longitudinal reinforcing filaments 31 to the primary roller 17 simultaneously with the first transverse layer 25, primary web of veil material 27 and thermoplastic film web 21. The unidirectional filaments are all oriented in the same direction, parallel to the length of the webs drawn from rolls 11, 19. The unidirectional filaments 31, like the filaments of transverse layer 25 are preferably pure fiberglass filaments ranging in size from about 20 to about 50 $\times 10^{-5}$ inch. Each filament is continuous for all practical purposes. The filaments are laid in a flat web substantially in a single plane. There is only one layer of filaments in the web drawn from the spool 29 over the roller 33 through the primary rollers 17.

Figure 4:
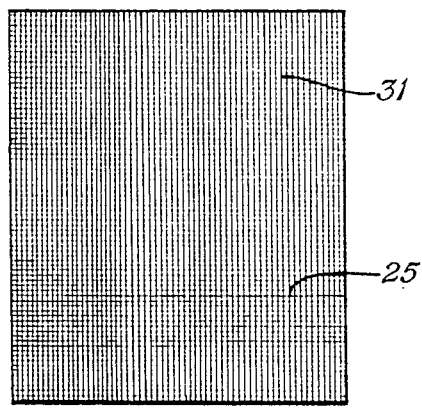
FIG. 4 is a top view of the first transverse layer of the composite member taken at the point indicated by the arrow in FIG. 1.

The first transverse layer 25 is oriented substantially perpendicular to the longitudinal fiberglass filaments 31 supplied from spool 29. FIG. 4 is a view looking down on the unidirectional fiberglass filaments 31 in the direction of the arrow shown in FIG. 1 and shows the first transverse layer running perpendicular to the unidirectional fiberglass filaments 31.

A resin applicator 35 (FIG. 1) is provided for applying resin to the unidirectional filaments 31, first transverse layer 25, primary web of veil material 27 and thermoplastic film 21 as the various materials exit the pair of primary rollers 17. The resin which is dispensed by applicator 35 can be a structural fiberglass resin of the type known in the art which is mixed with a catalyst and dispensed. A bar 37 or plate allows a resin bath 39 to be created beneath the applicator 35 so that the materials exiting the primary rollers 17 are impregnated in the bath 39. Polyester or vinylester resins especially designed for strength and corrosion resistance are used to bind the glass fibers making up the composite web which are impregnated in the bath 39. Plate 37, in addition to providing a pooling effect to create the bath 39, is approximately spaced to limit the resin content of the composite web 41 exiting the bath 39.

A second means 43 is provided for laying down a second transverse layer 45 of unidirectional filaments onto the layer of longitudinal filaments 31, as shown in FIG. 1. The second means 43 can also be a rapier weaving device identical to the first means 23 which is adapted to lay down a plurality of filaments substantially perpendicular to the longitudinal axis of the composite web 41 and the continuous longitudinal filaments 31. The center ply of unidirectional filaments 31 and upper and lower transverse layers 45, 25 make up the total fiber count of the finished composite member. Preferably about 25% to 33% of the total fiber count is in the transverse direction comprised by transverse layers 25, 45.

A pair of secondary rotatable rollers 47 receive the second transverse layer 45, longitudinal filaments 31, first transverse layer 25, primary web of veil material 27 and thermoplastic film backing 21. A second resin applicator 49 supplies resin to the composite web made up of the second transverse layer 45, unidirectional filaments 31, first transverse layer 25, primary web of veil material 27 and thermoplastic film backing 21. The resin dispensed by applicator 49 is a resin and catalyst. Applicator 49 can also dispense ultraviolet stabilized gel coat resins that provide maximum weathering capability where the surface of the composite member will be exposed to the effects of sun and rain. The preferred structural resin and gel coat resin are marketed under the trademark "ASHLAND 6858". The gel coat is a filled resin system that has pigment, fillers, and ultraviolet stabilizers.

A veil spool 51 provides a second web of veil material 53 identical to primary web 27. The second web of veil material 53 is drawn through the secondary rotatable rollers 47 on top of the second transverse layer 45, longitudinal filaments 31, first transverse layer 25, first web of veil material 27 and thermoplastic film backing 21 to form a composite web 55 exiting rollers 47.

A spool 57 provides a top layer of thermoplastic film 59 of Mylar which passes through a pair of rotatable rollers 61 simultaneously with the composite web 55 exiting rollers 47. The composite web 63 exiting rollers 61 is pulled on a suitable corrugation mold (not shown) and through an oven 65 where it is heated and shaped to form the fiberglass member using techniques known in the art. The corrugations run parallel with the unidirectional filaments 31. Traction means (not shown) at the exit of the oven pulls the entire composite web through the process continuously.

The operation of the embodiment of FIG'S. 1-5 will now be described with reference to FIG. 1. A web of veil material 13 which is backed by a web of thermoplastic film 21 is drawn toward a pair of primary rotatable rollers 17 by passing around rollers 15. A first transverse layer 25 is laid onto the veil web 27 as the web 27 is drawn toward the primary rollers 17. A web of longitudinal filaments 31 is drawn through the primary rotatable roller 17 on the top of the transverse layer 25, with the longitudinal filaments 31 being oriented parallel to the length of the web material being drawn through the primary roller 17.

A resin is applied to the composite web exiting the roller 17 through a resin applicator 35. The layers of material are impregnated by the resin bath 39 formed between the applicator 35 and plate 37 and on top of the backing 21 of Mylar. The composite web 41 exiting the first resin bath 39 is drawn toward a secondary pair of rotatable rollers 47. A second transverse layer 45 is laid on top of the longitudinal filaments 31 as the composite web 41 is drawn toward the rollers 47.

A second resin applicator 49 applies resin,, either structural resin or gelcoat resin to the composite web. A second web of veil material 53 supplied from a veil spool 51 is drawn through the secondary rollers 47 simultaneously with the composite web passing under the second resin applicator 49. The composite web 55 thus formed is drawn through rollers 61 simultaneously with a backing web 59 supplied from spool 57. The composite web 63 exiting roller 61 is drawn into an oven 65 where the composite web is molded to shape the corrugations of the fiberglass member, and heated and cured in a continuous process. The thermoplastic film backings 21 and 57 are continuously stripped from the composite member at the exit of the oven after the member has cured.

Figure 2:
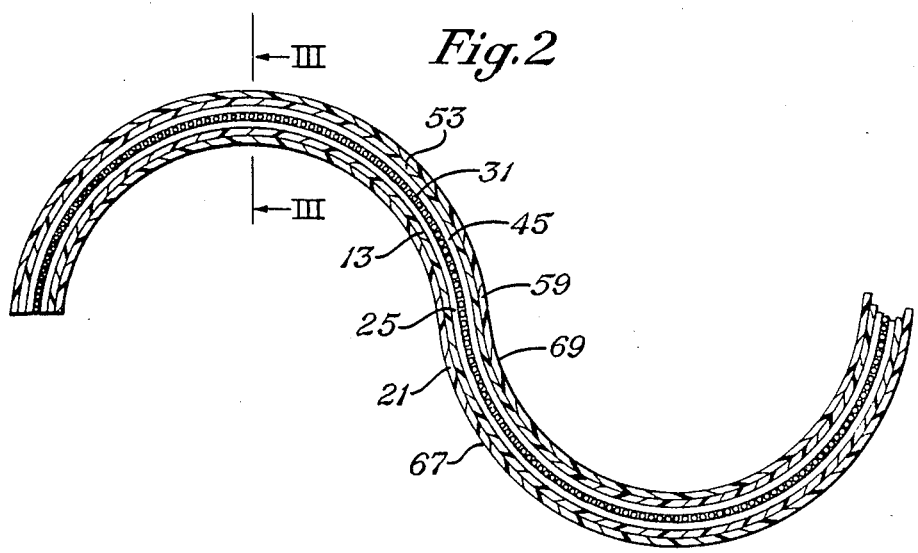
FIG. 2 is a partial transverse cross-sectional view of a composite corrugated member formed in accordance with the principles of the present invention.

FIG. 2 is a cross-sectional view of a composite member of the invention. The composite member includes a center ply of unidirectional longitudinal filaments 31, which is encapsulated by first and second transverse unidirectional filament layers 25, 45. First and second webs of veil material 13, 53 serve to push the structural filaments away from the outside surfaces 67, 69 of the finished member. This increases the life of the composite member by helping to keep corrosive elements away from the filaments.

Figure 3:
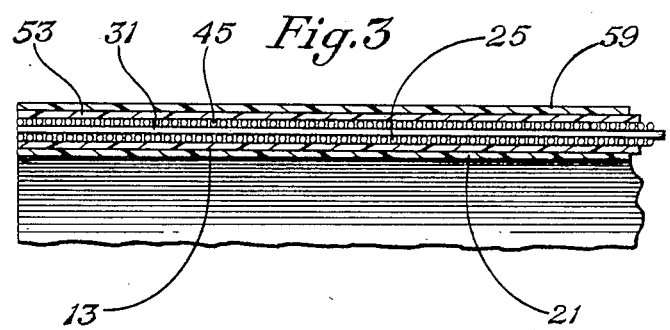
FIG. 3 is a partial cross-sectional view of the composite member of FIG. 2 taken along the lines III—III.
Figure 5:
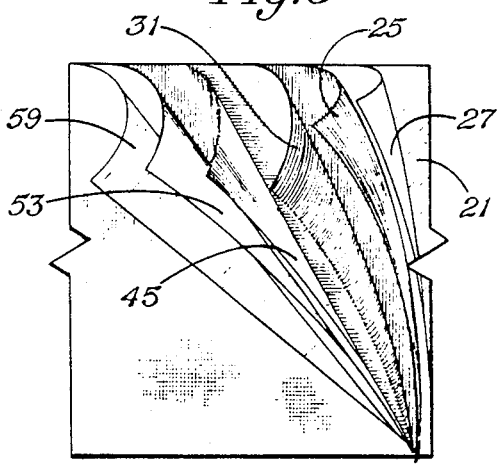
FIG. 5 is a schematic side view of the composite web formed by the apparatus of FIG. 1 with the various layers shown spread apart.

FIG. 3 is a partial cross-sectional view taken along lines III—III in FIG. 2 and shows the substantially perpendicular arrangement of the transverse unidirectional layers 25, 45 with respect to the center ply of unidirectional longitudinal filaments 31. FIG. 5 shows a composite member with the various layers peeled back.

Figure 6:
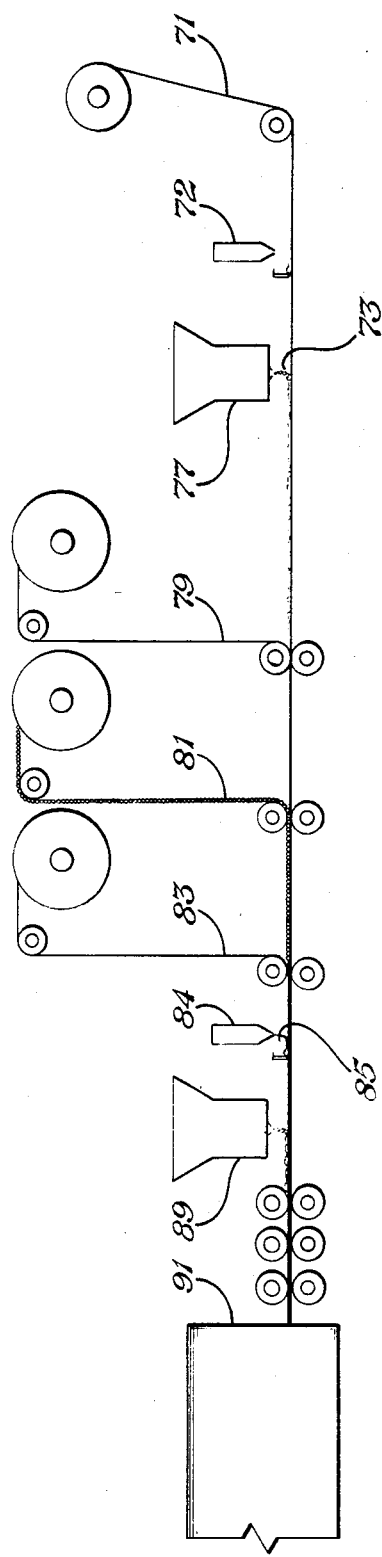
FIG. 6 is a schematic illustrating a method used in forming an alternate embodiment of a composite member.
Figure 7:
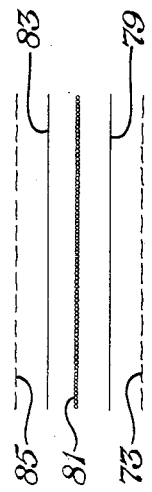
FIG. 7 is a schematic illustrating an exploded cross-section of the composite member formed in FIG. 6.

FIGS. 6 and 7 illustrate a second embodiment. In the second embodiment, a backing web 71 of Mylar is also pulled from a roll. A resin applicator 72 deposits resin in the same manner as shown in the first embodiment. Chopped filaments 73 are then deposited onto backing web 71. The chopped filaments are fiberglass strands about two inches in length. They fall randomly onto the web 71. The chopped filaments 73 may originate from a roll (not shown) of unidirectional filaments which are pulled through a conventional chopper 77. Chopper 77 is not shown in detail, but normally comprises a pair of rollers rotated in contact with each other, one of the rollers having knife blades that contact the other roller to shear the strands being pulled downward by the rollers. Preferably, about ¼ ounce per square foot is deposited on web 71 by chopper 77.

Then, a web of transverse filament 79 is laid on top of the chopped filaments 73. The transverse layer 79 may comprise unidirectional, parallel filaments extending perpendicular to the web 71 in the same manner as the transverse layers 25 and 45 of the first embodiment. Preferably, transverse layer 79 is knitted together by a light knitting material to keep the strands parallel and in the same plane, as described previously.

Then, a longitudinal unidirectional layer 81 is laid down on top of the transverse layer 79. Unidirectional directional layer 81 comprises continuous filaments parallel to the web 71 identical to unidirectional layer 31 of the first embodiment. The unidirectional layer 81 is laid down in the same manner as the unidirectional layer 31 of the first embodiment. Then, a second transverse layer 83 is laid down on top of the unidirectional layer 81. Transverse layer 83 is preferably identical to the transverse layer 79.

A resin applicator 84 applies additional resin to the layers, in the same manner as applicator 72. Next, a chopped layer 85 is laid on top of the second transverse layer 83. The chopped layer 85 is the same as the first chopped layer 73. It originates from unidirectional strands (not shown) fed through a conventional chopper 89. Again, about ¼ ounce per square foot of the chopped layer 85 is applied. The composite web then passes through compactor rollers, a corrugating mold (not shown), and into an oven 91, in the same manner as the first embodiment.

The resulting composite panel, as illustrated in FIG. 7, comprises a unidirectional layer or center ply 81 having filaments that extend parallel with the corrugations (not shown). The unidirectional center ply 81 is sandwiched by transverse layers 79 and 83, each of which may comprise filaments perpendicular to the filaments of the center ply 81. A chopped layer 85 is located on the outer side of the transverse layer 83, and a chopped layer 73 is located on the outer side of the transverse layer 79. Preferably, the total weight of the combined chopped layers 73 and 85 is about 3 to 9 percent of the total weight of the panel.

The chopped layers 73 and 85 have two functions. When the composite panel as described herein is cured, the resin shrinks. The shrinkage is resisted by the unidirectional longitudinal filaments 81 and unidirectional transverse filaments 79 and 83. This resistance results in residual stresses remaining in the panel. Some of the stresses will be transferred to the randomly oriented chopped fibers 73 and 85. The chopped fibers absorb and reduce some of the shrinkage stresses because of their random orientation.

A second function of the chopped layers 73 and 85 is to richen or increase the resin content on the outer side. The chopped fibers, being randomly oriented, provide more spaces for resin than unidirectional filaments. The resin, when located on the outer side of the structural layers 79, 81 and 83, serves to protect the filaments from the harmful effects of the environment, particularly the sun.

If the chopped layer is applied only for the purpose of richening the resin, and not to relieve stresses, then only a single layer need be applied if only one side of the panel is exposed to the sun. This might occur, for example, if the transverse layers were made up of a woven roving, rather than unidirectional filaments. In such a case, the shrinkage stresses might not be as severe as with unidirectional transverse layers, because a woven roving absorbs stresses more than unidirectional layers. Also, if richening the resin is not necessary, locating the chopped layers between the unidirectional longitudinal and transverse layers provides substantial stress relieving. Moreover, layers of veil could be incorporated for severe environmental uses.

The invention provided has significant advantages. The composite members having continuous, longitudinal unidirectional filaments placed parallel to the direction of loading to provide overall load carrying ability. To help the unidirectional filaments retain their shape under stress, upper and lower layers of transverse encapsulate the longitudinal filaments. The chopped layers in the second embodiment relieve shrinkage stresses in the unidirectional longitudinal and transverse layers, increasing the toughness and the shear resistance. The chopped layers also increase the resin content at the surfaces to better protect the filaments from sun.

I claim:

1. A corrugated composite panel, consisting essentially of:
 a center ply of longitudinal unidirectional reinforcing filaments, said filaments being continuous fibers running parallel to the longitudinal axis of said panel and to the corrugations of said panel;
 upper and lower transverse layers sandwiching said center ply of longitudinal filaments, said transverse layers being comprised of unidirectional reinforcing filaments oriented substantially perpendicular to said longitudinal filaments; and
 wherein said center ply and upper and lower transverse layers are impregnated with resin to form a composite panel.

2. The panel according to claim 1 further including a layer of veil material located on outer side of one of the transverse layers and also impregnated with the resin.

3. The panel according to claim 1 further including two layers of veil material, each located on an outer side of one of the transverse layers and also impregnated with the resin.

4. A corrugated composite panel, consisting essentially of:
 a center ply of longitudinal unidirectional reinforcing filaments, the filaments being continuous and running parallel to the longitudinal axis of the panel and to the corrugations of the panel;
 upper and lower transverse layers sandwiching the center ply of longitudinal filaments, the transverse being comprised of reinforcing filaments oriented transverse to the longitudinal filaments; and
 at least one chopped layer of chopped, randomly oriented filaments;
 the center ply and the layers being impregnated with resin to form a composite panel.

5. The panel according to claim 4 wherein the chopped layer is located on an outer side of one of the transverse layers for increasing the resin content on the outer side.

6. The panel according to claim 4 wherein the weight of the chopped layer is about 3 to 9 percent of the total weight of the panel.

7. The panel according to claim 4 further including a layer of veil material located on outer side of one of the transverse layers and also impregnated with the resin.

8. The panel according to claim 4 further including two layers of veil material, each located on an outer side of one of the transverse layers and also impregnated with the resin.

9. A corrugated composite panel, consisting essentially of:
 a center ply of longitudinal unidirectional reinforcing filaments, the filaments being continuous and running parallel to the corrugations of the panel;
 upper and lower transverse layers sandwiching the center ply of longitudinal filaments, the transverse layers being comprised of unidirectional reinforcing filaments oriented substantially perpendicular to the longitudinal filaments;
 at least one chopped layer of chopped, randomly oriented filaments;
 the center ply and the layers being impregnated with resin to form a composite panel.

10. The panel according to claim 9 wherein the chopped layer is located on an outer side of one of the transverse layers for increasing the resin content on the outer side and reducing shrinkage stresses in the panel.

11. The panel according to claim 9 wherein there are two chopped layers, each located on opposite sides of the center ply for reducing shrinkage stresses in the panel.

12. The panel according to claim 9 wherein the weight of the chopped layer is about 3-9 percent of the total weight of the panel.

13. The panel according to claim 9 wherein there are two chopped layers, each located on an outer side of one of the transverse layers for increasing the resin content on the outer sides and for reducing shrinkage stresses in the panel.

14. The panel according to claim 9 further including a layer of veil material located on outer side of one of the transverse layers and also impregnated with the resin.

15. The panel according to claim 9 further including two layers of veil material, each located on an outer side of one of the transverse layers and also impregnated with the resin.

* * * * *